United States Patent [19]
Mukai

[11] Patent Number: 5,334,680
[45] Date of Patent: Aug. 2, 1994

[54] EMULSION POLYMERIZATION METHOD FOR A BROMINATED STYRENE

[75] Inventor: Akihiro Mukai, Mihara, Japan

[73] Assignee: Teijin Chemicals, Ltd., Tokyo, Japan

[21] Appl. No.: 43,797

[22] Filed: Apr. 7, 1993

[30] Foreign Application Priority Data

Apr. 7, 1992 [JP] Japan ................................. 4-085547

[51] Int. Cl.$^5$ ........................... C08F 12/16; C08F 2/22
[52] U.S. Cl. .................................. 526/207; 526/293; 526/206; 526/208; 526/216
[58] Field of Search ........................ 526/293, 206, 207

[56] References Cited

U.S. PATENT DOCUMENTS 4,352,900 10/1982 Barda et al. ........................ 525/157

FOREIGN PATENT DOCUMENTS 0043906 1/1982 European Pat. Off. .
57684 12/1989 Japan .
9204387 3/1992 World Int. Prop. O. .

OTHER PUBLICATIONS

R. T. Morrison and R. N. Boyd, Organic Chemistry, 3rd Ed. Allyn and Bacon, Inc, Boston, 1973, p. 318.
J. Brandrup and E. H. Innergut, Ed., Polymer Handbook, 2nd Ed. Wiley, New York, 1975, pp. 611–619.

*Primary Examiner*—Mark Nagumo
*Attorney, Agent, or Firm*—Sherman and Shalloway

[57] ABSTRACT

An emulsion polymerization method for a brominated styrene is provided in which upon emulsion polymerizing a brominated styrene, an organic solvent which dissolves the brominated styrene and is sparingly soluble in water is added in an amount of 1 to 500 parts by weight per 100 parts by weight of the brominated styrene. According to this method, brominated polystyrenes can be produced which have acceptable hues and excellent physical properties and smell no offensive odor during the step of molding.

22 Claims, No Drawings

EMULSION POLYMERIZATION METHOD FOR A BROMINATED STYRENE

This invention relates to an emulsion polymerization method for a brominated styrene. More particularly, this invention relates to an emulsion polymerization method for a brominated styrene which can produce a brominated polystyrene that has excellent hue and excellent physical properties.

Brominated polystyrenes are used widely as a flame retardant for polyamides, polyethylene terephthalates, polybutylene terephthalates, ABS resins, etc. However, since they are colored, use of commercially available brominated polystyrenes fails to produce molded articles which are white or have clear or vivid tones. Therefore, it is expected that if such coloring of the brominated polystyrenes is absent, their utility will be expanded further.

Production methods for brominated polystyrenes include two types of methods; one is a method for brominating a polystyrene, and another a method for polymerizing a brominated styrene. As the method for brominating a polystyrene, there has been proposed, for example, a method in which styrene is brominated with bromine chloride using antimony trichloride as a catalyst (Japanese Patent Publication 57684/1989). With this method, it is very difficult to obtain brominated polystyrenes which are colored in no way. On the other hand, in a method in which a brominated styrene is polymerized by a solution polymerization process, it is difficult to give a high degree of polymerization, and a large amount of a solvent must be used to remove the monomer completely, resulting in that if the monomer remains, it will cause the occurrence of nasty smell upon molding or deterioration of physical properties of molded articles.

Emulsion polymerization method is a method in which a liquid monomer is dispersed in water with an emulsifying agent, and polymerization is carried out using a initiator. In the case of polymerization of tribromostyrene, emulsion polymerization can proceed at a temperature higher than the melting point of tribromostyrene 67° to 69° C. However, when tribromostyrene is added in an amount of 3 parts by weight or more per 100 parts by weight of water, most portions of tribromostyrene flocculates and solidifies as polymerization proceeds and the flocs or solids attach to blades of a stirrer, making it impossible to continue stirring. Because it is very difficult to grind the flocculated and solidified polymer, the yield is not increased. The polymer thus obtained has unacceptable hue.

Therefore, an object of the present invention is to provide a method for producing a brominated polystyrene which can obviate the aforementioned problems of the conventional methods, in particular a method for producing a brominated polystyrene which has good hue and excellent physical properties.

As a result of intensive investigation, the present inventors have found that a polymer satisfying the aforementioned object can be obtained with ease by emulsion polymerization of a brominated styrene in a reaction system to which a certain organic solvent is added, followed by removal of the separated organic solvent after completion of the polymerization and breaking emulsion state of the aqueous system. This invention is based on this discovery.

Therefore, according to this invention, there is provided an emulsion polymerization method for a brominated styrene, which comprises the steps of: adding, upon emulsion polymerizing a brominated styrene, an organic solvent which dissolves the brominated styrene and is sparingly soluble in water in an amount of 1 to 500 parts by weight per 100 parts by weight of the brominated styrene.

Polymerization is started by charging a reaction vessel equipped, for example, with a stirrer, a reflux condenser, etc. with a brominated styrene, water, organic solvent and a suitable emulsifying agent, converting the resulting mixture into an emulsion, and then adding a suitable polymerization initiator.

The organic solvent which can be used may be any organic solvent that dissolves the brominated styrene used and is sparingly soluble in water. The term "sparingly soluble in water" means that solubility in water at 25° C. is 5% by weight or less, preferably 2% by weight or less. In particular, those which do not dissolve or soften resultant polymers are preferred.

Examples of such an organic solvent include aliphatic hydrocarbons such as hexane, heptane, octane, and petroleum ether; aromatic hydrocarbons such as benzene, toluene, xylene, ethylbenzene, diethylbenzene, and chlorobenzene; halogenated hydrocarbons such as methylene chloride, chloroform, carbon tetrachloride, and tetrabromoethylene; alicyclic hydrocarbons such as cyclopentane, cyclohexane, and methylcyclohexane; ketones such as diisobutyl ketone, and methyl n-propyl ketone; esters such as n-propyl acetate, and n-butyl acetate, and the like. Among them aliphatic hydrocarbons are particularly preferred, as aliphatic hydrocarbons do not dissolve or soften resultant polymers.

Such organic solvents may be used singly or two or more of them. The organic solvents may be used in amounts of 1 to 500 parts by weight, preferably 30 to 200 parts by weight, per 100 parts by weight of brominated styrene subjected to emulsion polymerization. If the amount of the organic solvent is below 1 part by weight, no stable emulsion state can be maintained while use of above 500 parts by weight of the organic solvent is undesirable since a large amount of an emulsifying agent must be used, which is disadvantageous in view of cost.

Brominated styrene used in this invention includes, in the main, tribromostyrene and dibromostyrene. As such brominated styrene, any commercially available ones may be used. Commercially available brominate styrenes contain impurities such as bromoethyltribromobenzene and are colored in from whity yellow to pale brown. However, according to the method of this invention, use of such commercially available brominated styrenes as they are gives rise to colorless brominated polystyrenes.

In an initial stage of reaction, brominated styrenes are emulsified in a state in which they are dissolved in the organic solvent. In accordance with progress of reaction, resultant polymer separates from the organic solvent and a stable emulsion state continues to be maintained in an aqueous system. Unreacted brominated styrenes and impurity components therein separate from the resultant polymer and dissolve in the organic solvent. Therefore, a brominated polystyrene can be obtained with ease that has a good hue and a low content of remaining monomer by removal of the separated organic solvent after completion of reaction and breaking emulsion state of the aqueous system.

As the emulsifying agent, any one may be used that is generally used in emulsion polymerization. There can be cited, for example, anionic surfactants such as sodium rosinate, sodium stearate, potassium oleate, sodium laurate, and sodium dodecylbenzenesulfonate; cationic surfactants such as cetyltrimethylammonium bromide, and dodecylamine chloride; nonionic surfactants such as nonyl polyoxyethylene ether, and octyl phenyl polyoxyethylene ether, and the like. These emulsifying agents may be used singly or two or more of them may be used in combination.

As the polymerization initiator, there can be used any initiators that are used generally in emulsion polymerization. There can be cited, for example, persulfates or organic peroxides such as potassium persulfate, and ammonium persulfate, cumene hydroperioxide benzoil peroixde; redox initiators consisting of such a persulfate or organic peroxide with a reducing agent such as ferrous sulfate, and sodium sulfite, and the like.

As the flocculating agent used upon breaking the emulsion state, there can be used any flocculating agent which is used generally. There can be cited, for example, metal salts such as aluminum sulfate, sodium sulfate, zinc sulfate, magnesium sulfate, magnesium chloride, sodium chloride, calcium chloride, sodium carbonate, sodium hydrogen carbonate, and potassium alum; inorganic acids such as nitric acid, hydrochloric acid, and sulfuric acid; organic acids such as acetic acid, and propionic acid; organic polymer flocculating agents such as sodium polyacrylate, copolymers of maleic acid, salts of vinylpyridine copolymers, polyacrylic acid amides, and the like. These flocculating agents may be used singly or two or more of them may be used in combination dependent on the emulsifying agent used. In this invention, in particular, salts of polyvalent metals and inorganic acids are preferred.

In this invention, degree of polymerization can be adjusted using a polymerization modifier generally used in emulsion polymerization, for example, dodecylmercaptan, diisopropylxanthogen disulfide, etc.

The polymerization method of this invention can be applied not only to homopolymerization of a brominated styrene but also to copolymerization of two or more brominated styrenes, and further to copolymerization of one or more brominated styrenes and one or more radical polymerizable other monomers. Examples of such copolymerization include copolymerization of tribromostyrene with dibromostyrene, or copolymerization of tribromostyrene or dibromostyrene with an aromatic vinyl compound such as styrene, α-methylstyrene, or; a cyanovinyl compound such as acrylonitrile, or methacrylonitrile; an alkyl (meth)acrylate such as methyl (meth)acrylate, ethyl (meth)acrylate, or butyl acrylate; a vinyl compound such as acrylic acid, vinyl chloride, vinylidene chloride, or vinyl acetate; conjugated diolefin such as butadiene, chloropene, or isoprene; or one or more of their substituted compounds.

Hereinafter, this invention will be described in more detail by examples. However, this invention should not be construed as be being limited thereto. In example, all parts are by weight.

EXAMPLE 1

A flask, equipped with a stirrer, a reflux condenser, thermometer and a dropping funnel, was charged with 100 parts of tribromostyrene (pale yellow, commercially available, not purified), 5 parts of sodium stearate, 400 parts of deionized water, and 34 parts of heptane, deaerated, and purged with nitrogen, and then the temperature was elevated to 60° C. After establishment of an emulsion state was confirmed, a solution of 0.5 part of potassium persulfate in 30 parts of deionized water was added in the flask to initiate polymerization. After 3 hours' polymerization, a heptane layer which separated was removed, hydrochloric acid was added to the resulting emulsion to solidify, precipitates were filtered and washed with water, and dried to obtain a polymer. Table 1 below shows yield, remaining monomer content, and various physical properties of the polymer obtained.

EXAMPLE 2

A polymer was obtained in the same manner as in Example 1 except that 100 parts of tribromostyrene (pale yellow, commercially available, not purified), 10 parts of sodium dodecylsulfate, 700 parts of deionized water, 66 parts of hexane, 5.9 parts of dodecylmercaptan, and 0.5 part of potassium persulfate were used. Table 1 shows yield, remaining monomer content, and various physical properties of the polymer obtained.

EXAMPLE 3

A polymer was obtained in the same manner as in Example 1 except that 167 parts of dibromostyrene (pale yellow, commercially available, not purified), 133 parts of styrene, 6 parts of sodium dodecylsulfate, 800 parts of deionized water, 34 parts of heptane, 5 parts of potassium persulfate were used. Table 1 shows yield, remaining monomer content, and various physical properties of the polymer obtained.

TABLE 1

| | Example 1 | Example 2 | Example 3 |
|---|---|---|---|
| Yield of Polymer (%) | 96 | 93 | 93 |
| Molecular Weight of Polymer ($\times 10^3$) | 270 | 62 | 565 |
| Remaining monomer content (%) | 0.7 | 0.8 | 1.0 |
| Softening point of polymer (°C.) | 253–260 | 230–232 | 182–189 |
| Appearance of polymer | White powder | White powder | White powder |

COMPARATIVE EXAMPLE 1

The same reaction vessel as in Example 1 was charged with 5 parts of tribromostyrene (pale yellow, commercially available, not purified), 0.5 part of sodium dodecylbenzenesulfonate and 100 parts of deionized water, and the temperature was elevated to 70° C. After establishment of an emulsion state was confirmed, a solution of 0.1 part of potassium persulfate in 5 part of deionized water was added to initiate polymerization. After about 15 minutes, polymer solidified and attached to blades of the stirrer or wall of the vessel, resulting in failure of stirring.

EXAMPLE 4

A glass fiber reinforced polyethylene terephthalate was blended with the brominated polystyrene obtained in Example 1 and $Sb_2O_3$ in a compositional proportion shown in Table 2 below, an the resulting composition was melt-extruded at 270° C. using an extruder to prepare a flame retardant resin composition in the form of a pellet. From this a test piece was prepared using an injection molding machine whose cylinder treatment was set to 270° C., and flame retardant property and various mechanical properties were measured on this test piece.

For comparison, the same tests as described above were repeated except that commercially available brominated polystyrene I or II shown in Table 2 was used in place of the aforementioned brominated polystyrene.

Test results as shown in Table 2 were obtained.

TABLE 2

| Brominated Polystyrene | Example 1 | commercially[3] available product I | commercilly[4] available product II |
|---|---|---|---|
| Bromine content (%) | 69 | 68 | 53 |
| Molecular weight ($\times 10^3$) | 270 | 570 | 120 |
| Appearance | White powder | Pale yellow powder | Pale yellow powder |
| Composition | | | |
| Glass fiber reinforced PET[1] | 100 | 100 | 100 |
| Brominated polystyrene (PHR) | 12 | 12 | 12 |
| $Sb_2O_3$[3] (PHR) | 6 | 6 | 6 |
| Flame retardancy | | | |
| OI | 35.9 | 35.9 | 34.2 |
| UL-94 ⅛" | V-0 | V-0 | V-1 |
| UL-94 ¼" | V-0 | V-0 | V-1 |
| Strength at break (Kgf/cm²) | 1,200 | 1,000 | 1,200 |
| Elongation at break (%) | 2 | 2 | 2 |
| Bending strength (Kgf/cm²) | 1,900 | 1,700 | 1,900 |
| Elastic modulus in binding ($\times 10^3$ Kgf/cm²) | 94 | 94 | 99 |
| Deflection temperature under load (°C.) | 224 | 228 | 230 |
| Smelling in molding | odorless | odorless | offensive odor |
| Appearance of molded product | white | pale brown | pale brown |

Notes:
[1] Glass fiber reinforced polyethylene terephthalate; FR-PET C-3030, produced by Teijin Co., Ltd.
[2] ATOX-S, produced by Nippon Seiko
[3] PYROCHECK 68 PB, produced by Ferro Corp.
[4] PDBS-80M, produced by GLC Co.

As will be clear from the above-described examples, according to the emulsion polymerization method of this invention, brominated polystyrenes that have good hue and excellent physical properties can be produced with ease even when brominated styrenes containing impurities (coloring components) are used without purification. Such brominated polystyrenes of this invention can be utilized as a flame retardant also in various fields where no brominated polystyrene has been used because of coloring, and they exhibit significant industrial effects.

What is claimed is:

1. A method for the emulsion polymerization of brominated styrene which comprises the steps of charging a reaction vessel with a mixture consisting essentially of:
   a brominated styrene,
   an organic solvent which dissolves said brominated styrene and is sparingly soluble in water, in an amount of 1 to 500 parts by weight per 100 parts by weight of said brominated styrene,
   and carrying out the emulsion polymerization reaction.

2. The method of claim 1 in which said organic solvent is added in an amount of 30 to 200 parts by weight per 100 parts by weight of said brominated styrene.

3. The method of claim 1 in which said brominated styrene is at least one member selected from the group consisting of dibromostyrene and tribromostyrene.

4. The method of claim 1 in which the organic solvent is a member selected from the group consisting of aliphatic hydrocarbons and aromatic hydrocarbons, ketones and esters.

5. A method for the emulsion polymerization of brominated styrene which comprises the steps of charging a reaction vessel with:
   a brominated styrene,
   a hydrocarbon solvent which dissolves said brominated styrene and is sparingly soluble in water, in an amount of 1 to 500 parts by weight per 100 parts by weight of said brominated styrene, and
   carrying out the emulsion polymerization reaction.

6. The method of claim 5 in which said brominated styrene is at least one member selected from the group consisting of dibromostyrene and tribromostyrene.

7. The method of claim 5 in which the hydrocarbon solvent is a member selected from the group consisting of aliphatic hydrocarbon solvents.

8. The method of claim 5 in which the hydrocarbon solvent is a member selected from the group of hexane, heptane and octane.

9. The method of claim 5 in which the hydrocarbon solvent is a member selected from the group consisting of aromatic hydrocarbon solvents.

10. A method for the emulsion polymerization of brominated styrene which comprises the steps of charging a reaction vessel with:
    a brominated styrene,
    a hydrocarbon solvent which dissolves said brominated styrene and is sparingly soluble in water, in an amount of about 20 to 200 parts by weight per 100 parts by weight of said brominated styrene, and
    carrying out the emulsion polymerization reaction.

11. The method of claim 10 in which said organic solvent is added in an amount of 30 to 200 parts by weight per 100 parts by weight of said brominated styrene.

12. The method of claim 10 in which said brominated styrene is at least one member selected from the group consisting of dibromostyrene and tribromostyrene.

13. The method of claim 10 in which the hydrocarbon solvent is a member selected from the group consisting of aliphatic hydrocarbon solvents.

14. The method of claim 10 in which the hydrocarbon solvent is a member selected from the group of hexane, heptane and octane.

15. The method of claim 10 in which the hydrocarbon solvent is a member selected from the group consisting of aromatic hydrocarbon solvents.

16. A method for the emulsion polymerization of brominated styrene which consists essentially of the steps of charging a reaction vessel with:
    a brominated styrene,
    an organic solvent which dissolves said brominated styrene and is sparingly soluble in water, in an amount of 1 to 500 parts by weight per 100 parts by weight of said brominated styrene,
    carrying out the emulsion polymerization reaction, and recovering brominated polystyrene.

17. The method of claim 16 wherein the organic solvent is added in an amount of about 20 to 200 parts by weight per 100 parts by weight of said brominated styrene.

18. The method of claim 16 in which said organic solvent is added in an amount of 30 to 200 parts by weight per 100 parts by weight of said brominated styrene.

19. The method of claim 16 in which said brominated styrene is at least one member selected from the group consisting of dibromostyrene and tribromostyrene.

20. The method of claim 16 in which the hydrocarbon solvent is a member selected from the group consisting of aliphatic hydrocarbon solvents.

21. The method of claim 16 in which the hydrocarbon solvent is a member selected from the group of hexane, heptane and octane.

22. The method of claim 16 in which the hydrocarbon solvent is a member selected from the group consisting of aromatic hydrocarbon solvents.

* * * * *